A. W. ROBINSON.
CUTTER FOR HYDRAULIC DREDGES.
APPLICATION FILED SEPT. 29, 1910.
977,901.
Patented Dec. 6, 1910.
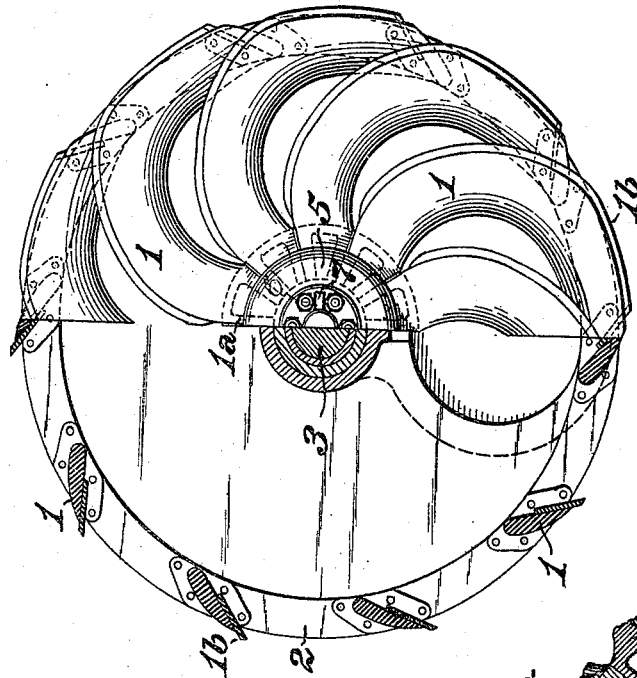
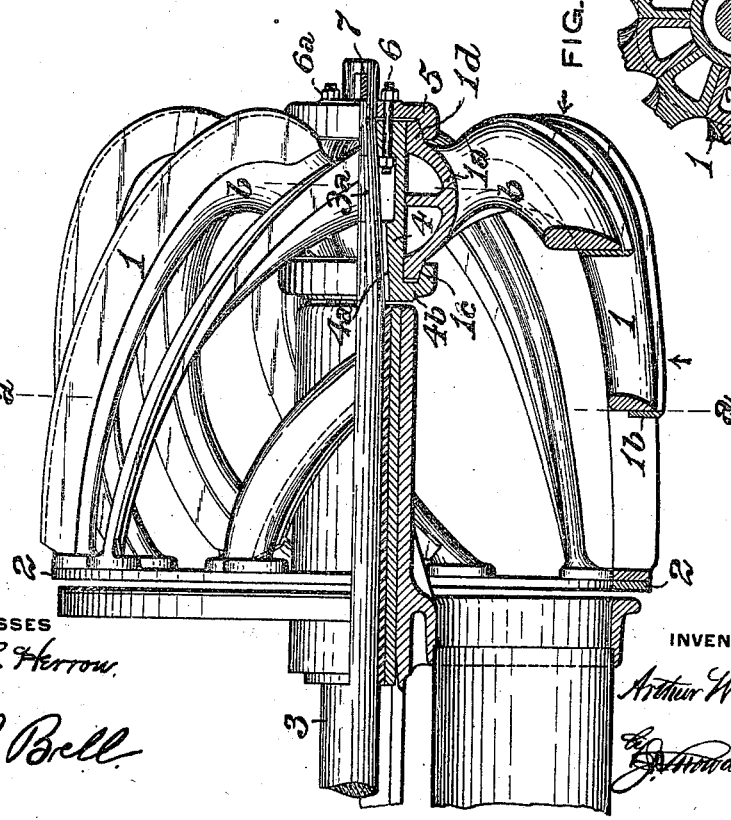
WITNESSES
James C. Herrow
S. R. Bell
INVENTOR
Arthur W. Robinson

UNITED STATES PATENT OFFICE.

ARTHUR W. ROBINSON, OF MONTREAL, QUEBEC, CANADA.

CUTTER FOR HYDRAULIC DREDGES.

977,901.  Specification of Letters Patent.  Patented Dec. 6, 1910.

Application filed September 29, 1910. Serial No. 584,463.

*To all whom it may concern:*

Be it known that I, ARTHUR W. ROBINSON, of Montreal, in the Province of Quebec and Dominion of Canada, have invented a certain new and useful Improvement in Cutters for Hydraulic Dredges, of which improvement the following is a specification.

My present invention relates to rotary cutting or excavating apparatus for hydraulic dredges, and is an improvement upon that for which Letters Patent of the United States No. 727,691 were granted and issued to me under date of May 12, 1903.

The object of my invention is to provide a more effective form of cutting blade, and also to so construct the blades as to render them readily detachable for renewal or repair when desired.

The improvement claimed is hereinafter fully set forth.

In the accompanying drawings: Figure 1 is a view, partly in side elevation and partly in longitudinal central section, of a cutter for hydraulic dredges, illustrating an embodiment of my invention; Fig. 2, a view, half in end elevation, as seen from the right, and half in transverse section on the line $a$ $a$ of Fig. 1, of the same; and Fig. 3, a transverse section, on the line $b$ $b$ of Fig. 1.

The cutter set forth in my Letters Patent No. 727,691 aforesaid, was divided into two sections, one consisting of a front set of blades formed in one piece with the head attached to the shaft, and the other of a continuing set of blades attached to a ring or support which connected the ends of the front set. Under my present invention, I dispense with the connecting ring or annulus of Patent No. 727,691, and provide a plurality of continuous blade arms, 1, which extend, in spiral form, from a connecting ring, 2, to which their outer ends are securely bolted, to a central hub, consisting of a plurality of sections, $1^a$, each internally segmentally recessed to fit the periphery of a cylindrical sleeve, one of which sections is formed integral with each of the blade arms, and which are clamped together to form the hub, as hereinafter described. Steel cutting blades, $1^b$, are riveted to and project slightly outwardly from the blade arms, 1. This construction attains, among others, the advantages over those previously known, of presenting entirely unobstructed cutting surfaces on the portions of the blades where the most work is done, that is the portions extending between the arrow heads in Fig. 1.

The cutter shaft, 3, is provided with a conical or tapered seat, $3^a$, adjoining its outer end, and a correspondingly bored cylindrical sleeve, 4, is fitted thereon, and held in position by one or more keys, $4^a$. An internally tapered flange, $4^b$, which constitutes a socket, is formed on the inner end of the sleeve, 4, said socket serving to receive the inner ends of the end sections, $1^a$, of the blade arms. The sides of said end sections, are formed at proper angles to abut and fit closely together on planes radial to the axis of the cutter, 3, as shown in Fig. 3, and when assembled in such relation, they are turned or machined on their end portions, so as to form frusto conical inner and outer end bearings, $1^c$ and $1^d$, respectively. The inner end bearing, $1^c$, fits truly in the socket, $4^b$, and the outer end portion, $1^d$, fits within a correspondingly bored annular cap, 5, which is bored out to fit on the outer portion of the tapered seat, $3^a$, of the cutter shaft. The assembled end sections, $1^a$, of the blade arms are clamped rigidly together on the sleeve 4, between the socket, $4^b$, and the cap, 5, by a plurality of bolts, 6, passing through the outer end of the sleeve, 4, and the cap, 5, and provided with nuts, $6^a$, by which the tapered bore of the cap is drawn tightly against the corresponding surface of the outer bearing, $1^d$, of the blade arm end sections. The parts are further rigidly secured together by a transverse key or wedge, 7, passing through the cutter shaft, adjacent to its outer end, and bearing on the outer end of the cap, 5.

It will be seen that the members of the cutter above described are securely held in connection one to the other and with the cutter shaft; that the cutting blades are readily attachable to, and detachable from, their supporting arms, and present unobstructed surfaces to the work; and that the removal and replacement of a blade arm for renewal or repair can be readily effected whenever desired.

I claim as my invention and desire to secure by Letters Patent:

1. In a cutter for hydraulic dredges, the combination of a plurality of continuous spiral blade arms, each having a hub section on its inner end, and means for connecting said hub sections into a continuous hub.

2. In a cutter for hydraulic dredges, the combination of a plurality of continuous spiral blade arms, each having a hub section at its inner end, a central sleeve around which said hub sections are abuttingly assembled, and means for connecting said hub sections and sleeve.

3. In a cutter for hydraulic dredges, the combination of a plurality of continuous spiral blade arms, each having a hub section at its inner end, a central sleeve around which said hub sections are abuttingly assembled, and means for clamping said hub sections one against the other and against said sleeve.

4. In a cutter for hydraulic dredges, the combination of a plurality of continuous spiral blade arms, each having a hub section at its inner end, means for connecting said hub sections into a continuous hub, and a connecting ring secured to the outer ends of the blade arms.

5. In a cutter for hydraulic dredges, the combination of a plurality of continuous spiral blade arms, each having a hub section at its inner end, provided with conically turned end bearings, a central sleeve having a conically bored socket in which said hub sections are fitted, a conically bored cap encircling the opposite ends of the hub sections, and means for clamping said cap upon the hub sections.

6. In a cutter for hydraulic dredges, the combination of a plurality of continuous spiral blade arms, each having a hub section at its inner end, provided with conically turned end bearings, a central sleeve having a conically bored socket in which said hub sections are fitted, a conically bored cap encircling the opposite ends of the hub sections, and clamping bolts connecting the central sleeve and cap.

7. In a hydraulic dredge, the combination of a cutter shaft, a sleeve secured thereon, a plurality of continuous spiral blade arms, each having a hub section at its inner end, means for connecting said hub sections into a continuous hub encircling the shaft sleeve, and a connecting ring secured to the outer ends of the blade arms.

8. In a hydraulic dredge, the combination of a cutter shaft having a conical seat adjoining its outer end, a conically bored cylindrical sleeve fitting on said seat, and having a conically bored socket on one of its ends, a plurality of continuous spiral blade arms, each having a hub section on its inner face which is segmentally recessed to fit the periphery of the sleeve, and is provided with conical end bearings, a conically bored cap encircling the outer ends of the hub sections, bolts by which the hub sections are clamped between the socket of the sleeve and the cap, and a transverse key or wedge by which the sleeve and attached members are clamped to the cutter shaft.

ARTHUR W. ROBINSON.

Witnesses:
VALENTINE J. R. CHRISTIAN,
FRANCIS E. M. ROBINSON.